UNITED STATES PATENT OFFICE.

IGNAZ ROSENBERG, OF BIEBRICH, GERMANY, ASSIGNOR TO KALLE & CO., OF SAME PLACE.

BLUISH-SCARLET DYE.

SPECIFICATION forming part of Letters Patent No. 588,180, dated August 17, 1897.

Application filed July 29, 1896. Serial No. 600,979. (Specimens.) Patented in England May 7, 1895, No. 9,103, and in France May 22, 1895, No. 247,626.

*To all whom it may concern:*

Be it known that I, IGNAZ ROSENBERG, residing at Biebrich-on-the-Rhine, in the Empire of Germany, have invented certain new and useful Improvements in the Manufacture of Azo Dyestuffs from Monamins and 1.3 Naphthylenediamin Mono and Di Sulfo-Acids, (for which I have obtained Letters Patent in England, No. 9,103, dated May 7, 1895, and in France, No. 247,626, dated May 22, 1895,) of which the following is an exact description.

By combining the 1.3 naphthylenediamin mono and di sulfo-acids described in my simultaneous application, filed July 29, 1896, Serial No. 600,978, and characterized by containing the two amido groups in meta or 1.3 position with diazotized monamins, I have succeeded in producing a new class of very valuable azo dyestuffs ranging in shade from yellow to red, brown, and dark violet. All these dyestuffs are distinguished by their great tinctorial power, by their great affinity to the fiber, by producing bright and even shades, which are extremely fast against light, washing, and alkalies, and which are much faster against acids than the dyestuffs produced from other naphthylenediamin sulfo compounds.

For the production of the new coloring-matters which are the subject of the present application I combine in either alkaline or acetic-acid solution one molecule of any known diazo body with one molecule of a 1.3 naphthylenediamin mono or di sulfo-acid. The 1.3.6 naphthylenediamin-monosulfo-acid gives with diazotized anilin or sulfanilic acid an orange; with xylidin, a red-orange; with paranitranilin, a brownish yellow; with alpha and beta naphthylamin and naphthionic acid, red wool-dyestuffs; with dehydrothio paratoluidin sulfo-acid and dehydrothio metaxylidin sulfo-acid, red substantive cotton-dyestuffs.

In carrying out my invention practically I proceed as follows:

Example: Thirty-two kilos of dehydrothio paratoluidin sulfo-acid are diazotized with fifteen kilos of muriatic acid, 20° Baumé, and seven kilos nitrite of sodium. The resulting fine suspension of the diazo body is run into a cold aqueous solution of twenty-five kilos 1.3.6 naphthylenediamin-monosulfo-acid and twenty kilos of soda-ash. The so-formed coloring-matter having the formula

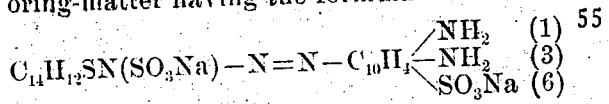

is precipitated by common salt in fine needles or leaflets of yellowish bronze. It is filtered of the salt liquor, pressed, and dried. After being dried and ground it represents a reddish-brown bronzy powder, easily soluble in hot water, insoluble in alcohol, soluble in concentrated sulfuric acid with violet coloration, giving on alkaline reduction with zinc-dust a yellow solution which quickly turns brown under the influence of the air. It dies on unmordanted cotton a bright bluish-scarlet shade which is fast against the action of soap and light and which is only very little altered by acids.

Now what I claim is—

1. The process of producing new azo dyestuffs consisting in the combination of molecular proportions of diazotized monamins with 1.3 naphthylenediamin-sulfo-acids.

2. The process of producing the specific dyestuff having the formula:

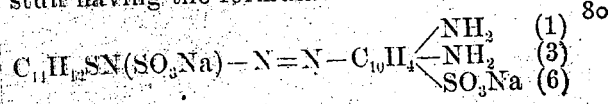

by combining molecular proportions of diazotized dehydrothio paratoluidin monosulfo-acid with 1.3.6 naphthylenediamin-monosulfo-acid substantially as described.

3. A dyestuff derivable from a 1.3 naphthylenediamin sulfo compound, which will crystallize in fine needles or leaflets of yellow bronze, forming after drying and grinding brownish-red bronzy powders, easily soluble in hot water, insoluble in alcohol, soluble in concentrated sulfuric acid with violet coloration, giving on alkaline reduction with zinc-dust, yellow solutions, which quickly turn brown under the influence of the air, dyeing on unmordanted cotton a bright bluish scarlet, which shade is fast against the action of soap and light, substantially as described.

4. The new dyestuff with the formula:

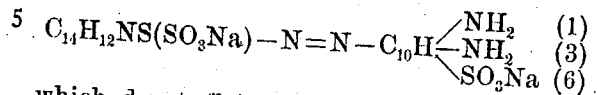

which dyestuff is producible by combining molecular proportions of diazotized dehydrothio paratoluidin sulfo-acid with 1.3.6 naphthylenediamin-monosulfo-acid; and which crystallizes in fine needles or leaflets of yellowish bronze forming after drying and grinding a brownish-red bronzy powder, easily soluble in hot water, insoluble in alcohol, soluble in concentrated sulfuric acid with violet coloration, giving on alkaline reduction with zinc-dust a yellow solution which quickly turns brown under the influence of the air; dyeing on unmordanted cotton a bright bluish scarlet which shade is fast against the action of soap and light; and having the qualities substantially as described.

In testimony whereof I have signed my name to this specification in the presence of two subscribing witnesses.

IGNAZ ROSENBERG.

Witnesses:
FRIEDRICH KRECKE,
HEINRICH WISCHLER.